(12) United States Patent
Gerlofs et al.

(10) Patent No.: US 7,509,885 B2
(45) Date of Patent: Mar. 31, 2009

(54) TRANSMISSION AUXILIARY UNIT TIMED SHIFT INHIBITOR

(75) Inventors: Kurt Gerlofs, Kalamazoo, MI (US); Dave Stevens, Athens, MI (US); Mark Hirsch, Vicksburg, MI (US); Charles Bradley, Gobles, MI (US); Michael J. Huggins, Kalamazoo, MI (US); Gerard F. Smith, Kalamazoo, MI (US); Michael E. Lemon, Battle Creek, MI (US)

(73) Assignee: Eaton Corporation, Cleveland, OH (US)

( * ) Notice: Subject to any disclaimer, the term of this patent is extended or adjusted under 35 U.S.C. 154(b) by 245 days.

(21) Appl. No.: 11/284,668

(22) Filed: Nov. 22, 2005

(65) Prior Publication Data
US 2006/0185456 A1     Aug. 24, 2006

Related U.S. Application Data

(60) Provisional application No. 60/630,174, filed on Nov. 22, 2004.

(51) Int. Cl.
*F16H 59/68*     (2006.01)
(52) U.S. Cl. .......................... 74/335; 74/745
(58) Field of Classification Search ............ 701/64
See application file for complete search history.

(56) References Cited

U.S. PATENT DOCUMENTS

| | | | |
|---|---|---|---|
| 2,654,268 A | 10/1953 | Perkins | |
| 3,138,965 A | 6/1964 | Brey et al. | |
| 3,229,551 A | 1/1966 | Stuckey | |
| 4,060,005 A | 11/1977 | Bost | |
| 4,269,642 A | 5/1981 | DeCasperis et al. | |
| 4,450,869 A | 5/1984 | Acker | |
| 4,616,978 A * | 10/1986 | Matheson et al. | ............... 417/2 |
| 4,793,378 A | 12/1988 | Loeffler et al. | |
| 4,944,197 A | 7/1990 | Stine et al. | |

(Continued)

FOREIGN PATENT DOCUMENTS

GB     2005364     4/1979

(Continued)

OTHER PUBLICATIONS

International Search Report for PCT/US2005/042539.

*Primary Examiner*—Sherry L Estremsky
*Assistant Examiner*—Edwin A Young
(74) *Attorney, Agent, or Firm*—Rader, Fishman & Grauer PLLC

(57) ABSTRACT

An embodiment provides a shift inhibitor apparatus. At least a portion of the range actuating assembly is moveable between a range first ratio and a range second ratio. The portion of the range actuating assembly is moveable, at least in part, in response to a fluid pressure. The range chamber is selectively in fluid communication with a vent. The shift inhibitor includes a main section neutral interlock having an interlock chamber. At least a portion of the main section neutral interlock is moveable between a first condition and a second condition. The interlock chamber is selectively in fluid communication with the vent. The range chamber can be exhausted such that the range section is selectively switched from the first ratio to the second ratio. The interlock chamber can be exhausted such that the main section neutral interlock is selectively switched from the first condition to the second condition.

19 Claims, 13 Drawing Sheets

U.S. PATENT DOCUMENTS

| | | |
|---|---|---|
| 4,974,474 A | 12/1990 | Newbigging |
| 5,172,604 A * | 12/1992 | Monette et al. ............... 74/335 |
| 5,186,066 A | 2/1993 | Pankratz et al. |
| 5,193,410 A | 3/1993 | Stine et al. |
| 5,216,931 A | 6/1993 | Hirsch et al. |
| 5,224,392 A | 7/1993 | Hutchison et al. |
| 6,042,504 A | 3/2000 | Gualtieri et al. |
| 6,339,973 B1 | 1/2002 | Monette et al. |
| 6,520,040 B2 | 2/2003 | Cox |

FOREIGN PATENT DOCUMENTS

| | | |
|---|---|---|
| GB | 2127503 | 4/1984 |

* cited by examiner

TRANSMISSION AUXILIARY UNIT TIMED SHIFT INHIBITOR

CROSS REFERENCE TO RELATED APPLICATIONS

This application claims the benefit of Provisional Application 60/630,174, filed on Nov. 22, 2004, the contents of which are hereby incorporated by reference herein in their entirety.

TECHNICAL FIELD

The technical field is generally control systems for shifting the auxiliary sections of compound transmissions, and particularly, pneumatic control and interlock systems for a range type compound transmission.

BACKGROUND

Compound transmissions of the range or combined range/splitter type are well known in the prior art. Such transmissions typically comprise a multiple speed main transmission section connected in series with a range type auxiliary section wherein the range step is greater than the total ratio coverage of the main transmission section.

In such transmissions, the main section is typically shifted by means of a shift housing assembly controlled by a manually operated shift lever or the like. In contrast, the auxiliary range section is shifted by means of a button or switch. In the prior art, a switch operated by the main section shift mechanism controls a remote slave valve/actuator mechanism. The valve/actuator mechanism controls operation of a range selection actuator. The range selection cylinder includes a fluid-actuated piston that divides an actuator cylinder into a low-range and a high-range chamber. The piston is made to move in response to selective pressurization of one chamber while simultaneously exhausting a second chamber. Since the range section often utilizes synchronized jaw clutches, a range shift is preferably initiated and completed while the main transmission section is in neutral, to provide acceptable shift quality and to prevent undue wear and/or damage to the synchronized jaw clutches.

Prior art compound range type transmissions usually include a control system, which is typically a pneumatic control system having interlock devices, that allows a range shift to be preselected using a selector button or switch at a master control valve. To prevent damage to the jaw clutches, the control system prevents shift initiation until the main transmission section is shifted to, or at least towards, the neutral condition. One method for preventing shift initiation utilizes mechanical type interlock devices on the range section actuator mechanical linkage that physically prevent movement of the range section shift fork until the main section is shifted into neutral. A second, more common method of preventing shift initiation utilizes logic-based interlock devices of the type wherein the valve supplying pressurized fluid to the range section cylinder is either disabled or not provided with pressurized fluid until a shift to main section neutral is sensed, or is only activated and provided with pressurized fluid while the main section is shifted to and remains in neutral. Examples of such transmissions and the control systems therefor may be seen by reference to U.S. Pat. Nos. 2,654,268; 3,138,965, 4,060,005 and 4,974,474.

Prior art systems are particularly concerned with protecting the range synchronizer during range upshifts, or upshifts to the high range. It has been discovered that for certain systems, successful completion of a high range shift is more likely to be achieved in a timely fashion relative to the shifting of the main section. In such transmissions, it is highly desirable to provide a mechanism for protecting the low range synchronizer.

SUMMARY

An embodiment provides a shift inhibitor apparatus for a multiple speed transmission main section. The transmission includes an input shaft and an output shaft. The transmission main section has a plurality of selectively engageable ratios. The transmission also has a range section shiftable between a range high ratio and a range low ratio. The shift inhibitor includes a range actuating assembly having a range chamber. At least a portion of the range actuating assembly is moveable between a range first ratio and a range second ratio. The portion of the range actuating assembly is moveable, at least in part, in response to a fluid pressure. The range chamber is selectively in fluid communication with a vent. The shift inhibitor includes a main section neutral interlock having an interlock chamber. At least a portion of the main section neutral interlock is moveable between a first condition and a second condition. The interlock chamber is selectively in fluid communication with the vent. The range chamber can be exhausted such that the range section is selectively switched from the first ratio to the second ratio. The interlock chamber can be exhausted such that the main section neutral interlock is selectively switched from the first condition to the second condition.

In an embodiment, a shift apparatus for encouraging the completion of a range shift in a range section of multispeed transmission prior to the completion of a main shift in a main section of the multispeed transmission is provided. The transmission includes an input shaft and an output shaft. The transmission main section has a plurality of selectively engageable ratios. The transmission has a range section shiftable between a first ratio and a second ratio. The apparatus includes a range actuating assembly having a range chamber. At least a portion of the range actuating assembly is moveable between a first position and a second position to shift the range section from the first ratio to the second ratio. The portion of the range actuating assembly is moveable, at least in part, in response to a fluid pressure. The apparatus includes a vent in selective fluid communication with the range chamber, and a first transmitter for introducing a first fluid force within the range actuating assembly. The apparatus also includes a second transmitter for introducing a second fluid force within the range actuating assembly. A first fluid pressure is selectively supplied to the range actuating assembly when the shift member is engaged in a preselected gear.

An embodiment provides a method of encouraging the completion of a range shift in a range section of multispeed transmission prior to the completion of a main shift in a main section of the multispeed transmission. The multispeed transmission includes an input shaft, an output shaft, a range section shiftable between a first ratio and a second ratio. The main section has a plurality of selectable gear ratios. The method includes the step of shifting the main section from a first predetermined gear to a second predetermined gear. The step of shifting the main section includes the steps of initiating a shift between gears of the main section and completing the shift between gears of the main section. The method includes the step of detecting a position of a shift member. The step of detecting is performed after the step of initiating the shift between gears of the main section and before the step of completing the shift between gears of the main section. The method also includes the step of shifting the range section from the first ratio to the second ratio. The step of shifting the range section includes the steps of initiating a shift between gears of the range section and completing the shift between gears of the range section. The step of shifting the range section is performed, at least in part, by a fluid actuated device. The method further includes the step of ensuring the step of completing the shift between gears of the range section is performed before the step of completing the shift between gears of the main section.

DETAILED DESCRIPTION

Figure 1:
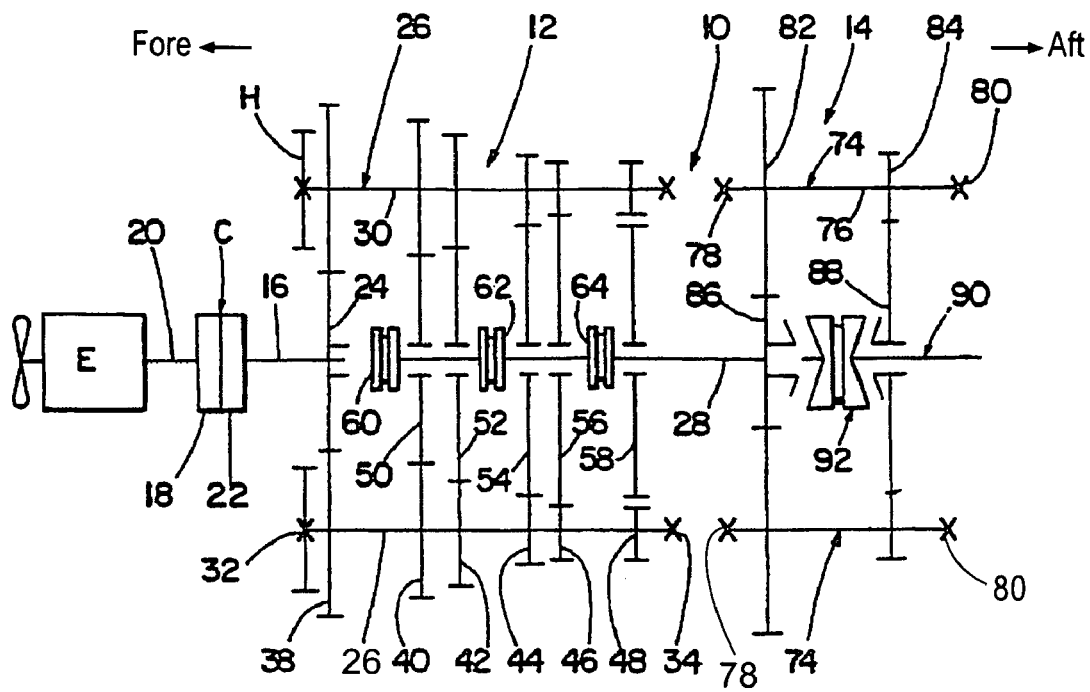
FIG. 1 is a schematic illustration, not to scale, of a compound transmission having a range type auxiliary section and utilizing the pneumatic control system.
Figure 2:
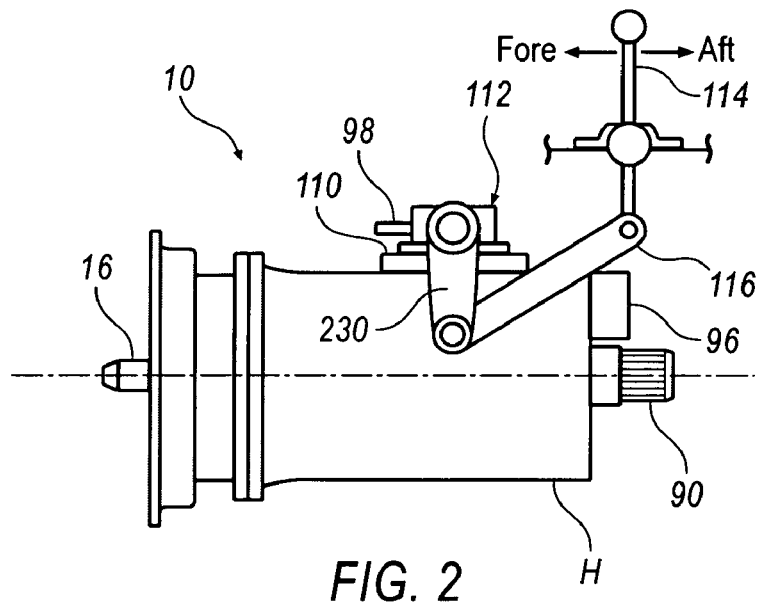
FIG. 2 is a schematic illustration of the exterior components of the shift mechanism of the transmission of FIG. 1.
Figure 3:
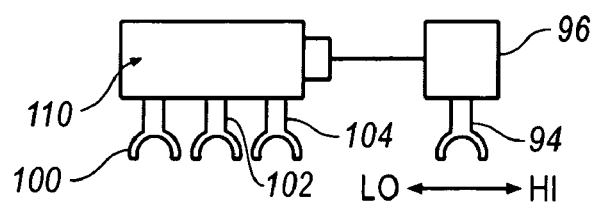
FIG. 3 is a schematic illustration of the shift housing element of the main section and the range actuator assembly of the transmission of FIG. 1.

Referring to FIGS. 1, 2 and 3, a range type compound transmission 10 is illustrated. Compound transmission 10 comprises a multiple speed main transmission section 12 connected in series with a range type auxiliary section 14.

Transmission 10 is housed within a housing (not shown) and includes an input shaft 16 driven by a prime mover such as diesel engine E through a selectively disengaged, normally engaged friction master clutch C having an input or driving portion 18 drivingly connected to the engine crankshaft 20 and a driven portion 22 rotatably fixed to the transmission input shaft 16.

In main section 12, the input shaft 16 carries an input gear 24 for simultaneously driving a pair of countershaft assemblies 26 at substantially identical rotational speeds. The two countershaft assemblies 26, which may be substantially identical, are illustrated on diametrically opposite sides of the mainshaft 28 which is generally coaxially aligned with the input shaft 16. Each of the countershaft assemblies 26 comprises a countershaft 30 supported by bearings 32 and 34 in the housing. Each of the countershaft assemblies 26 is provided with a grouping of countershaft gears 38, 40, 42, 44, 46 and 48, fixed for rotation therewith. A plurality of mainshaft gears 50, 52, 54, 56 and 58 surround the mainshaft 28 and are selectively clutchable, one at a time, to the mainshaft 28 for rotation therewith by sliding clutch collars 60, 62 and 64, as is well known in the prior art. Clutch collar 60 may also be utilized to clutch input gear 24 to mainshaft 28 to provide a direct drive relationship between input shaft 16 and mainshaft 28.

Mainshaft gear 58 is the reverse gear and is in continuous meshing engagement with countershaft gears 48 by means of conventional intermediate idler gears (not shown). It should also be noted that while main section 12 does provide five selectable forward speed ratios, the lowest forward speed ratio, namely that provided by drivingly connecting mainshaft drive gear 56 to mainshaft 28, is often of such a high gear reduction it has to be considered a low or "creeper" gear which is utilized only for starting of a vehicle under severe conditions and, is not usually utilized in the high transmission range. Accordingly, while main section 12 does provide five forward speeds, it is usually referred to as a "four plus one" main section as only four of the forward speeds are compounded by the auxiliary range section 14 utilized therewith.

With continual reference to FIG. 1, auxiliary transmission range section 14 includes two substantially identical auxiliary countershaft assemblies 74 each comprising an auxiliary countershaft 76 supported by bearings 78 and 80 in housing H and carrying two auxiliary section countershaft gears 82 and 84 for rotation therewith. Auxiliary countershaft gears 82 are constantly meshed with and support a range input/main section output gear 86 that is fixed to mainshaft 28. Auxiliary section countershaft gears 84 are constantly meshed with an auxiliary section output gear 88 that surrounds transmission output shaft 90.

With specific reference to FIGS. 1 and 3, the auxiliary transmission range section 14 further includes a synchronized two-position auxiliary section jaw clutch assembly 92. The jaw clutch assembly 92 is axially positioned by means of a range shift fork 94 (also illustrated in FIG. 14). The jaw clutch assembly 92 is rotatably fixed to output shaft 90 for rotation therewith. A range section shifting actuator assembly 96 is provided for clutching either gear 88 to output shaft 90 for low range operation, or gear 86 and mainshaft 28 to output shaft 90 for direct or high range operation of the compound transmission 10, as discussed in greater detail below.

With reference to FIGS. 3-7, the shifting of gears in the main section 12 will be described in greater detail. Typically, clutch collars 60, 62 and 64 are axially positioned by means of shift forks 100, 102 and 104, respectively. Clutch collars 60, 62 and 64 may be of the well known synchronized or non-synchronized double acting jaw clutch type. In the exemplary embodiment, clutch collars 60 and 62 are synchronized, and clutch collar 64 is nonsynchronized.

Figure 4:
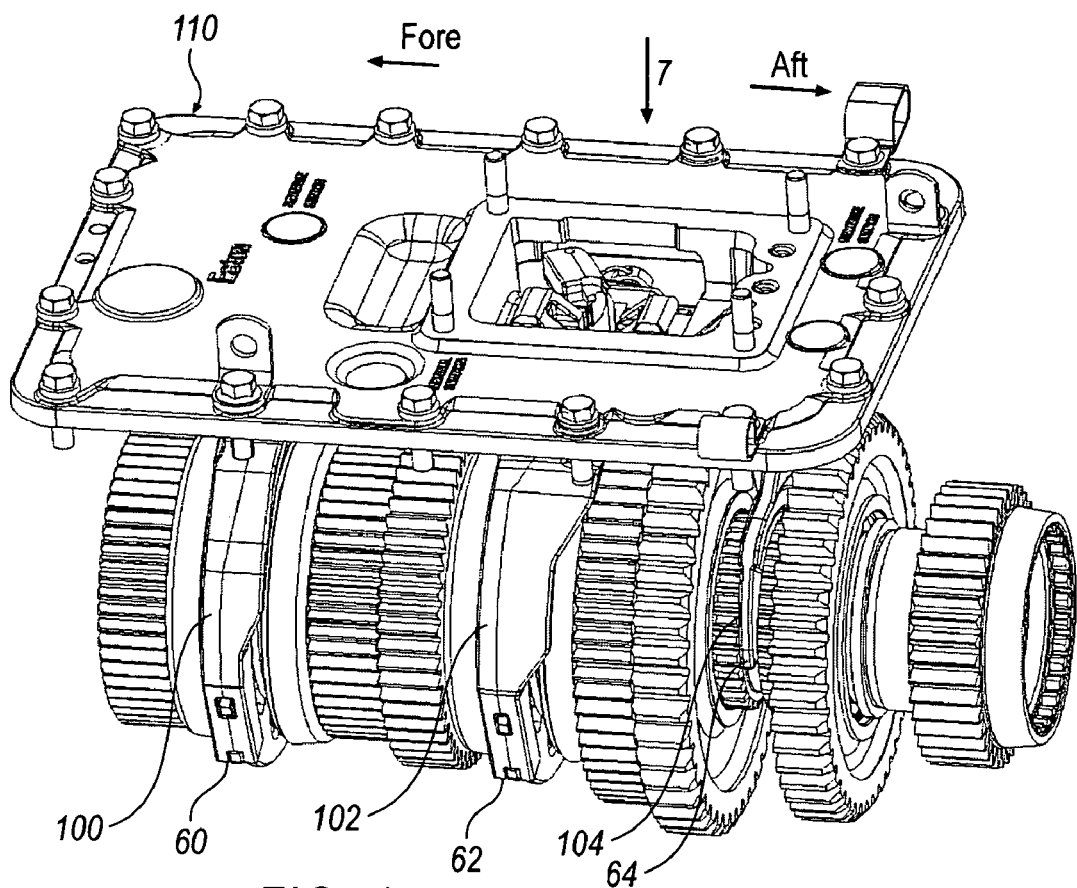
FIG. 4 is a perspective view of the shift housing assembly together with the mainshaft assembly of the transmission of FIG. 1 from the back/left/top directions.
Figure 5:
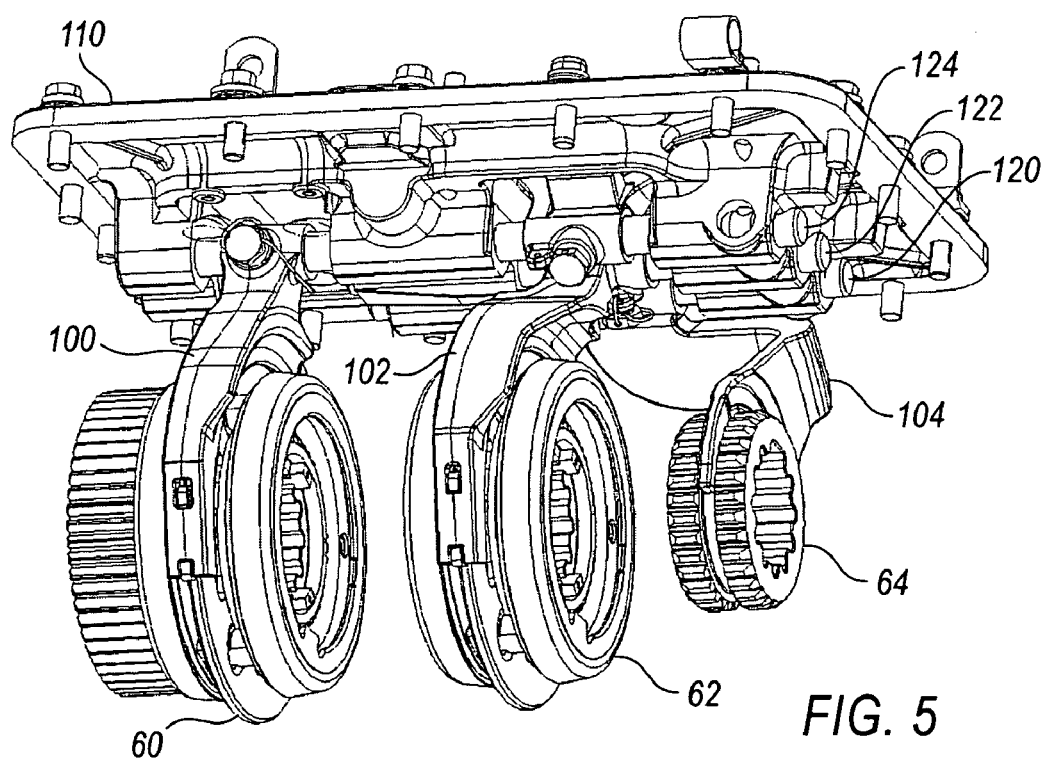
FIG. 5 is a perspective view of the shift housing assembly together with the selector mechanism of the transmission of FIG. 1 from the back/left/bottom directions.
Figure 6:
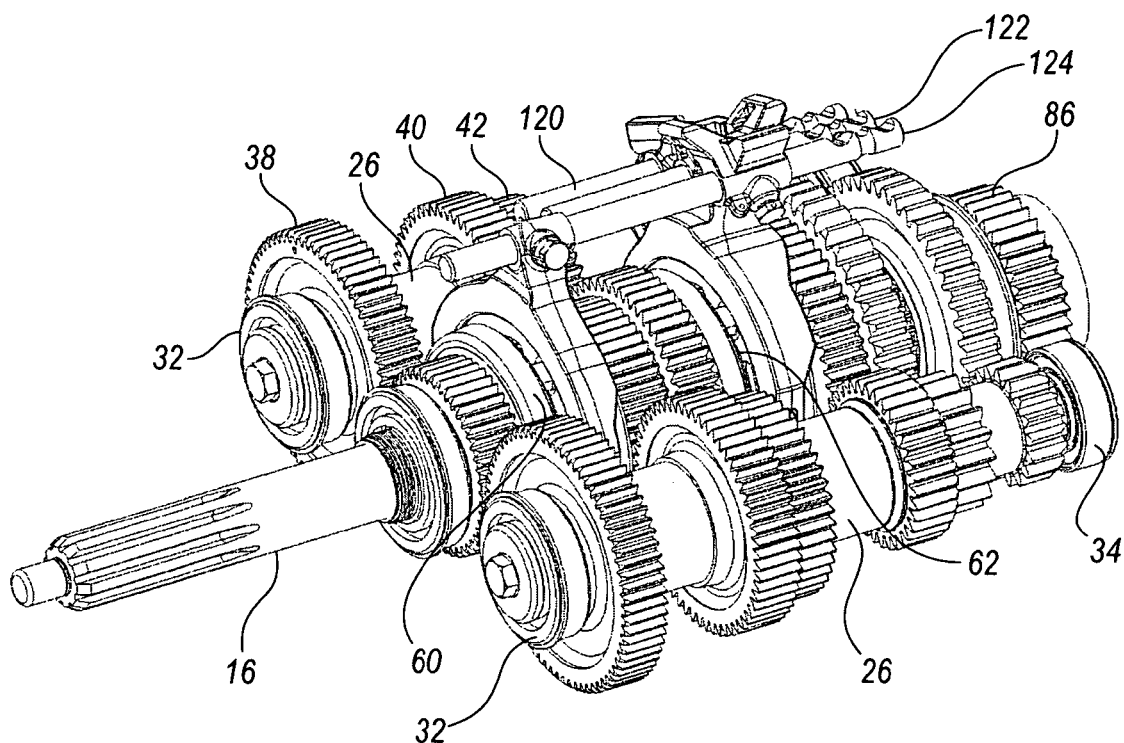
FIG. 6 is a perspective view of the shaft assemblies of the main section of the transmission of FIG. 1.
Figure 9:
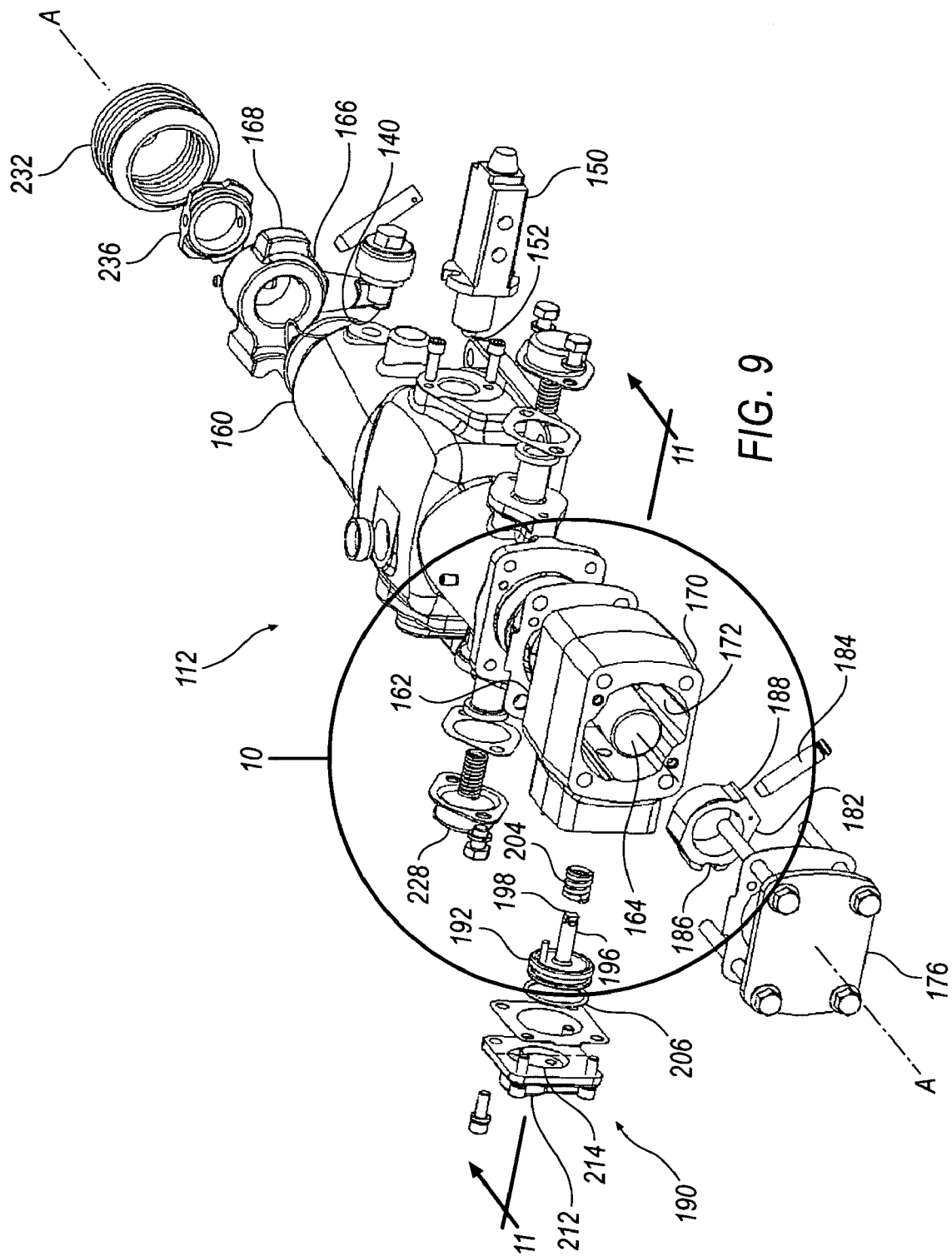
FIG. 9 is a perspective exploded view of the selector mechanism of FIG. 5 in the general direction of the view of FIG. 4.
Figure 10:
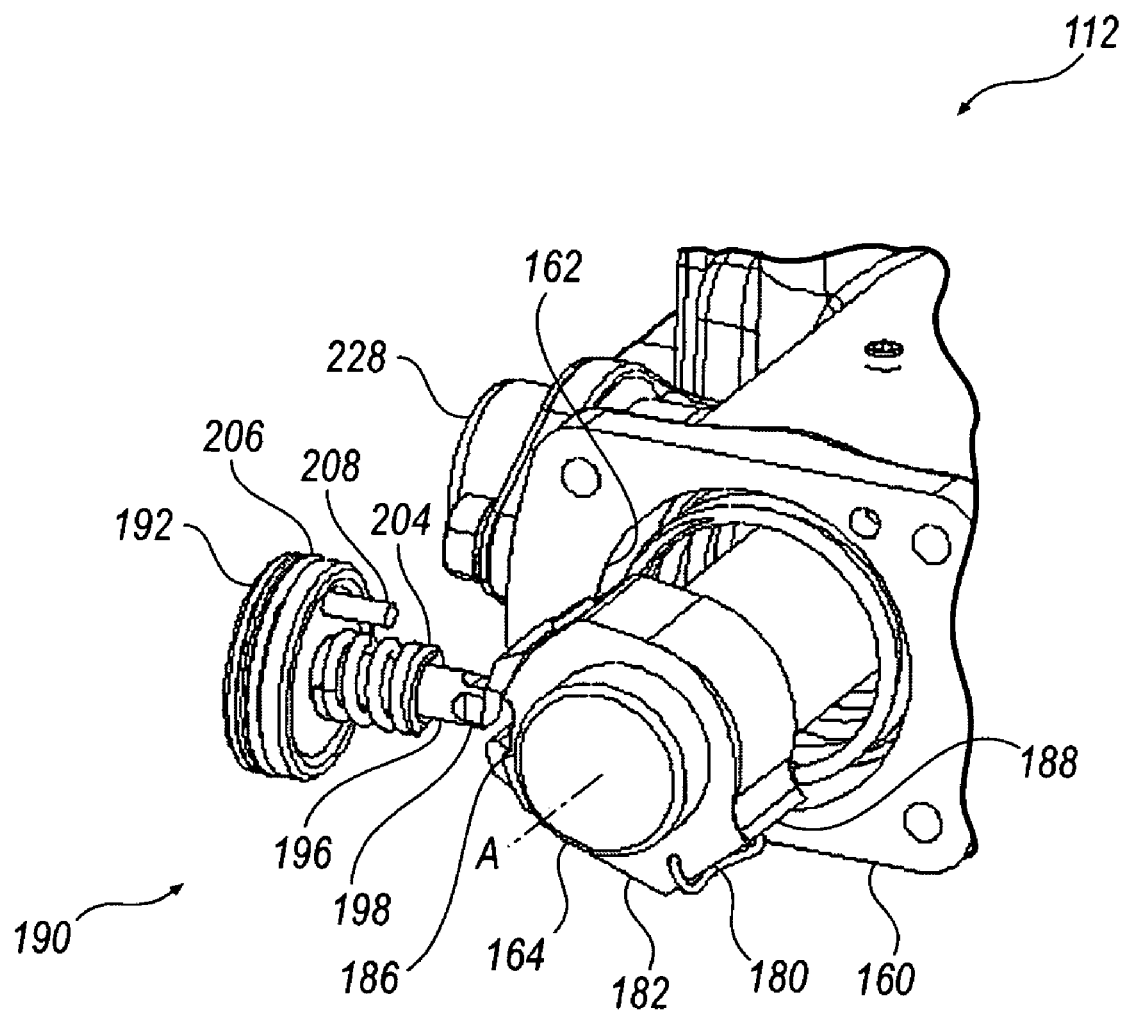
FIG. 10 is an enlarged broken out partial view of the portion of FIG. 9 found in circle 10.

Clutch collars 60, 62, and 64 are three-position clutches in that they may be positioned, as illustrated in FIG. 1, in the centered nonengaged position, in a fore engaged position or in an aft engaged position by means of shift forks 100, 102, and 104 respectively. In the illustrated embodiment, and as best seen in FIGS. 4 and 5, shift forks 100, 102, and 104 are integrated into a shift housing assembly 110. The shift forks 100, 102, and 104 extend from the shift housing assembly 110 and are controlled by a selector mechanism 112 (as best seen in FIGS. 2, 5, and 9) positioned over housing assembly 110, as described below. Selector mechanism 112 is in turn controlled by an operator manipulated transmission input device, or shift lever, 114 (FIG. 2). Shift lever 114 is connected to selector mechanism 112 through an intermediate shift linkage 116, and may be disposed some distance from selector mechanism 112. In the embodiment illustrated, only one of the clutch collars 60, 62 and 64 is engageable at a given time and a main section interlock means (not shown) may be provided to lock the other clutches in the neutral condition. As discussed in greater detail below, the user need only manually manipulate a single shift lever 114 in order to shift both the main section 12 and the range section 14.

The main section 12 is controlled by axial movement of, in the illustrated embodiment, three shift rails 120, 122 and 124 contained within the shift housing assembly 110 and controlled by operation of the shift lever 114 via the intermediately disposed selector mechanism 112, as shown in FIGS. 2-8. Alternative mechanisms to the three rail shift arrangement may be employed, with such mechanism having more shift rails, or just a single shift rail such as the one shown in U.S. Pat. No. 4,621,537.

Figure 7:
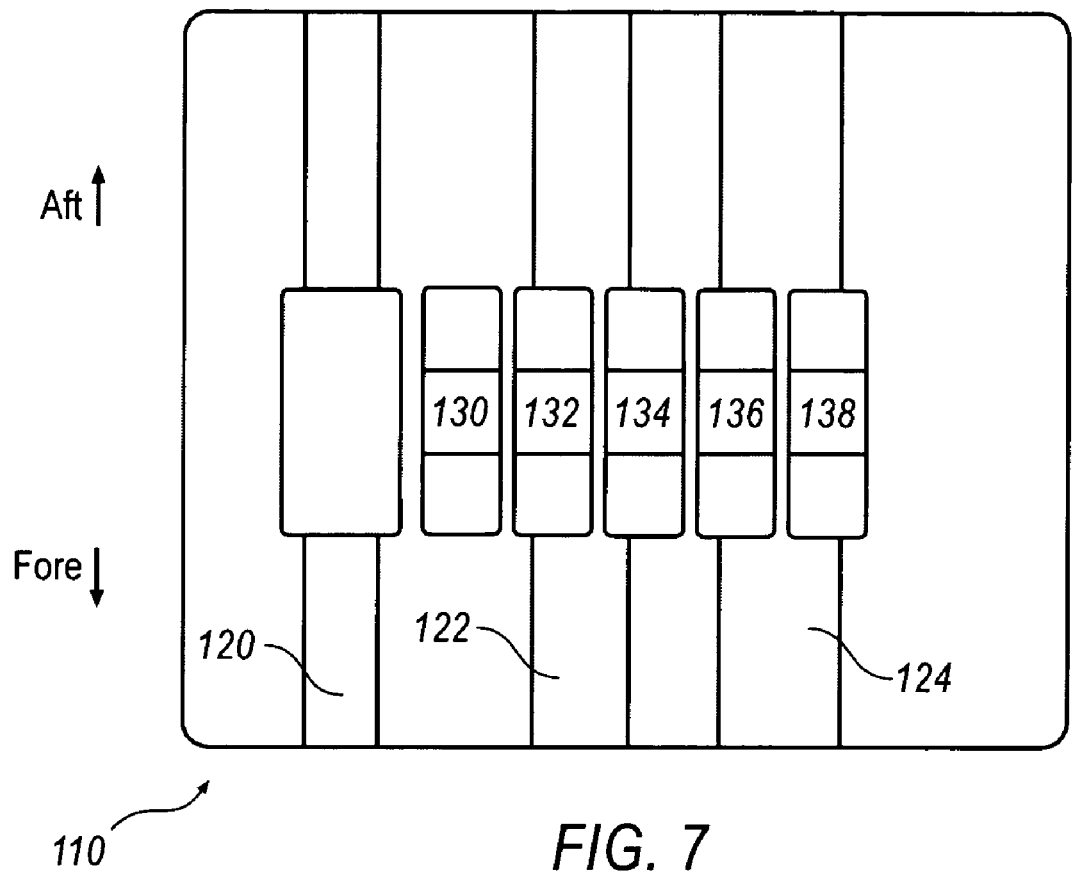
FIG. 7 is a schematic illustration of the shift gate arrangement of the transmission of FIG. 1 taken along the direction of arrow 7 in FIG. 4.
Figure 8:
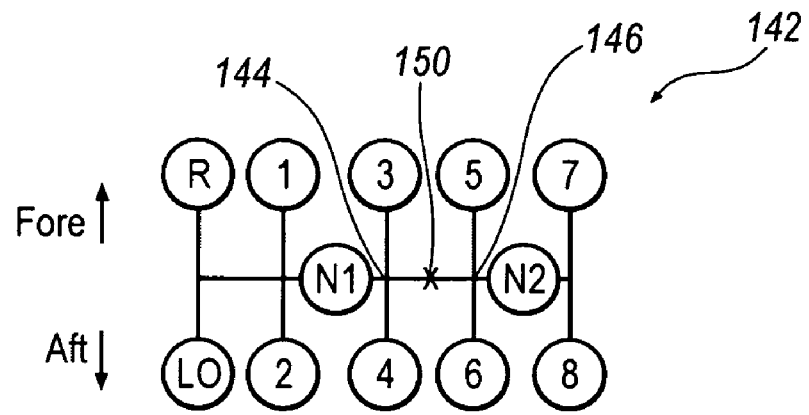
FIG. 8 is a schematic illustration of the shift pattern of the transmission of FIG. 1.

With specific reference to FIG. 7, the shift forks 100, 102, 104 have corresponding shift gates 130, 132, 134 for the Lo-R, 1-2 and 3-4 gear ranges respectively (FIG. 8). A 5-6 shift gate 136 and a 7-8 shift gate 138 provide high range gear ratios, as discussed below. Shift fork 100, with integral shift gates 134 and 138, is affixed to shift rail 124. Shift fork 102, with integral shift gates 132 and 136, is affixed to shift rail 122. Shift fork 104, with integral shift gate 130, is fixed to shift rail 120. As illustrated in FIG. 7, main section 12 is in a neutral condition, where clutch collars 60, 62, 64 are not engaged.

With reference to FIG. 8, a shift pattern 142 for the shift lever 114 of the transmission 10 is illustrated. Shift pattern 142 includes a 3-4 throw position 144 and a 5-6 throw position 146. Referring to both FIGS. 7 and 8, shift gate 130 corresponds to a Lo-R shift throw. That is, when the shift lever 114 is generally in the Lo-R shift throw position, the shift lever 114 may be moved in the fore direction to place the shift lever 114 in the R shift position. When shift lever 114 is in the R shift position, the main section 12 of the transmission 10 is in 'reverse' with the mainshaft gear 58 'engaged' with the clutch collar 64. Similarly, when the shift lever 114 is generally in the Lo-R shift throw position, the shift lever 114 may be moved in the aft direction to place the shift lever 114 in the Lo shift position. When shift lever 114 is in the Lo shift position, the main section 12 of the transmission 10 is in 'low gear' with the mainshaft gear 56 engaged with the clutch collar 64. Accordingly, when the shift lever 114 is generally in the Lo-R shift throw position, the transmission 10 is in the Lo-R shift range, and shift lever 114 may be manipulated to translate the shift gate 130. Shift lever 114 operates similarly when in the 1-2, 3-4, 5-6, and 7-8 throw positions. Shift pattern 142 also includes multiple neutral positions, such as N1 and N2. As described below, the range section 14 will be in engaged in a range low ratio when shift lever 114 is in neutral position N1, and the range section 14 will be in engaged in a range high ratio when shift lever 114 is in neutral position N2.

As best illustrated in FIG. 9, selector mechanism 112 also includes a shift finger 140 of selector mechanism 112 is selectively disposed in one of the shift gates 130, 132, 134, 136, 138. Movement of shift finger 140 displaces a selected one of the forks and thereby engages a target gear. Movement of shift lever 114 controls the position of shift finger 140.

In the exemplary embodiments, selector mechanism 112 may include a position switch 150. While an embodiment of the position switch 150 is illustrated in FIG. 9, a possible location of the position switch 150 within the shift pattern of the transmission 10. Shifting of the auxiliary or range section 14 is controlled by operation of a position switch 150 integrated into selector mechanism 112 as is well known in the prior art. The selector mechanism 112 and the shift housing assembly of the preferred embodiment together provide a "double H" type shift pattern as illustrated in FIG. 8. Position switch 150 is a fluid type switch, specifically a pneumatic switch. It is to be appreciated that position switch 150 may alternatively be characterized as a valve. Position switch 150 has a plunger 152 which displaces a valve within a valve body (not shown). Position switch 150 communicates pressurized truck service air to the range section shifting actuator assembly 96 to effect shifts between the low and high ranges. Such pneumatic switches are well known.

Position switch 150 signals the range section to shift to the high range, using jaw clutch assembly 92 to connect output shaft 90 with mainshaft 28, as shift finger 140 moves from the 3-4 shift gate 134 to the 5-6 shift gate 136. Conversely, position switch 150 signals the range section 14 to shift to low as shift finger 140 moves from the 5-6 shift gate 136 to the 3-4 shift gate 134. However, it is to be appreciated that range gear selection could alternatively be made by operation of a button or a switch by the vehicle operator. Yet alternatively, a "repeat H" pattern, like that shown in U.S. Pat. No. 6,339,1403 could be employed. All of these arrangements are well known in the prior art. It is to be appreciated that the precise shift pattern is not limited to the embodiments presented herein. However, one important aspect concerns how shifting of the main section is restricted to protect the auxiliary section synchronizer.

Further, although the range section 14 is illustrated as a two-speed section which may utilize spur or helical type gearing, it is understood that the embodiments presented herein are also applicable to range type transmissions utilizing combined splitter/range type auxiliary sections, having three or more selectable range ratios and/or utilizing planetary type gearing. Also, as indicated above, any one or more of clutch collars 60, 62 or 64 may be of the synchronized jaw clutch type and transmission sections 12 and/or 14 may be of the single countershaft type.

As noted above, certain situations may arise where the vehicle user, or operator, requests a shift to low range in the range section of an auxiliary transmission, but completes a shift of the main transmission before the auxiliary transmission completes its shift to low range. Such a situation may lead to the range piston exerting a force through the synchronizer on clutch jaws resulting in an undesired level of energy dissipation therebetween.

The embodiments presented herein of selector mechanism 112 are key to preventing or reducing such occurrences. The selector mechanism 112 provides a mechanism by which an operator manipulating the shift lever 114 may laterally position the shift finger 140 in a desired shift gate and then displace the shift finger 140 in a fore-aft direction to engage the desired main section gear. Embodiments of selector mechanism 112 are shown in detail in FIGS. 9-13, and discussed in greater detail below. The selector mechanism 112 reduces the risk of engaging a main section 12 gear before the range shift has been completed, and particularly before a range section 14 shift to gear 88 (low range shift) has been completed.

As best seen in FIG. 9, selector mechanism 112 also includes a selector mechanism housing 160. Selector mechanism housing 160 serves to cover the opening in the shift housing assembly 110, as well as to support the rest of the parts of selector mechanism 112. Housing 160 defines an elongated cavity 162 therein extending the length thereof. Housing 160 rotatably supports a shift member, or shift shaft, 164 disposed in cavity 162. Shaft 164 rotates about an axis A-A. A collar portion 166 is affixed to shaft for rotation therewith. Collar portion 166 includes the shift finger 140, mentioned previously, and an engaging surface, or cam surface, 168. Position switch 150 is mounted to a forward side of housing 160 in selective alignment with collar portion 166 as will be later described in more detail.

Briefly referring to FIGS. 7 and 8, and with continual reference to FIG. 9, when shift finger 140 is adjacent the 5-6 shift gate 136 or the 7-8 shift gate 138, the shift shaft 164 is in a high range position, which corresponds to the high range position indicated in FIG. 8.

Selector mechanism 112 also includes a housing extension 170 disposed at a first end of housing 160. Housing extension 170 defines an extension cavity 172. Extension cavity 172 is generally aligned with cavity 162. Although the illustrated embodiment shows extension 170 as being separate from housing 160, and fastened thereto, it is anticipated that housing 160 could be formed to include extension 170. The main reason for forming extension 170 as a separate piece is to permit the use of the embodiments described herein with a stock of existing housings 160 not having the features of extension 170. Cavities 162, 172 are closed, at least in part, by an end plate 176 fastened to housing extension 170 opposite housing 160.

Figure 11:
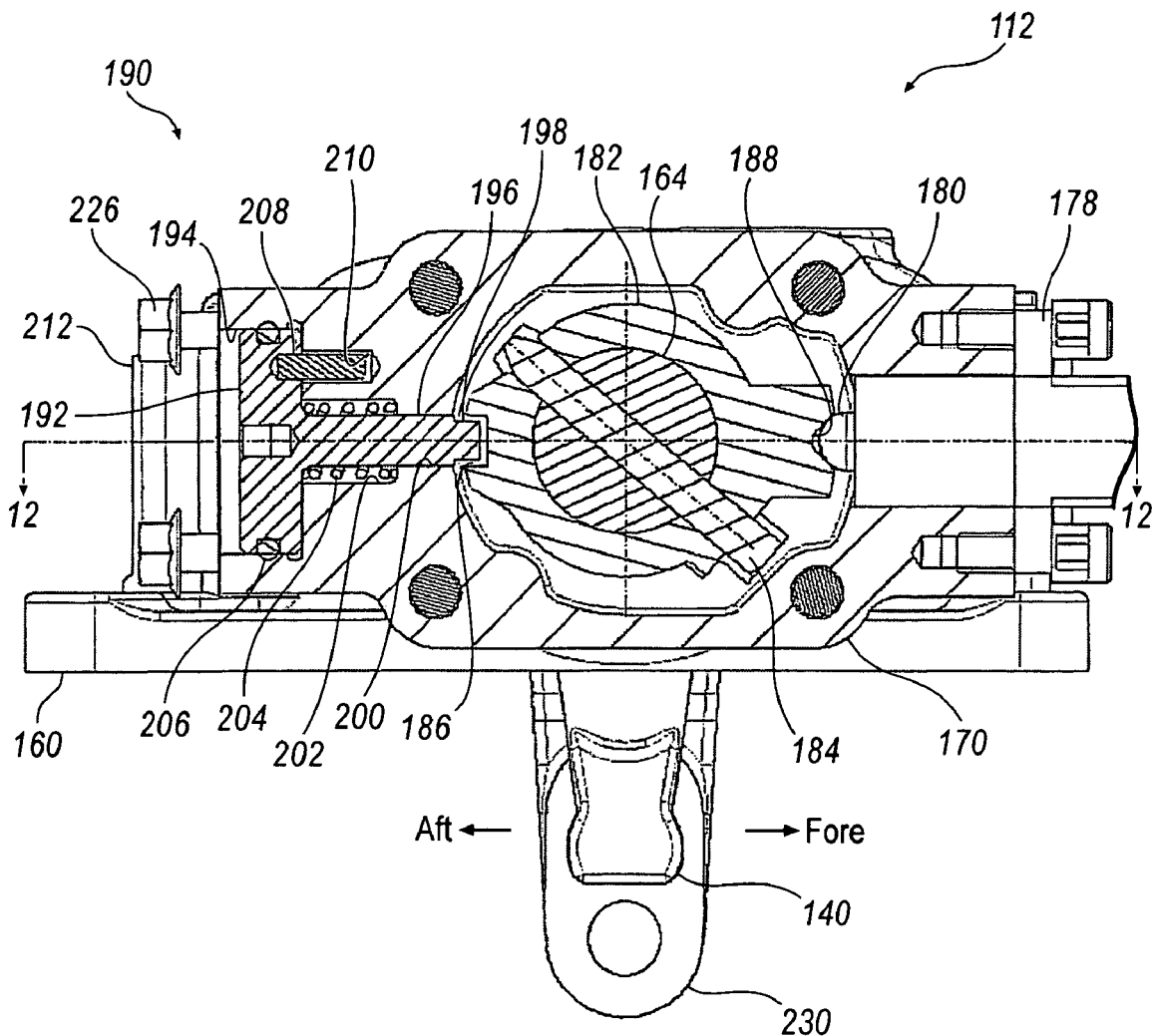
FIG. 11 is a section view of the selector mechanism taken in the direction of line 11-11 in FIG. 9, and illustrating a dual pressure switch.
Figure 12:
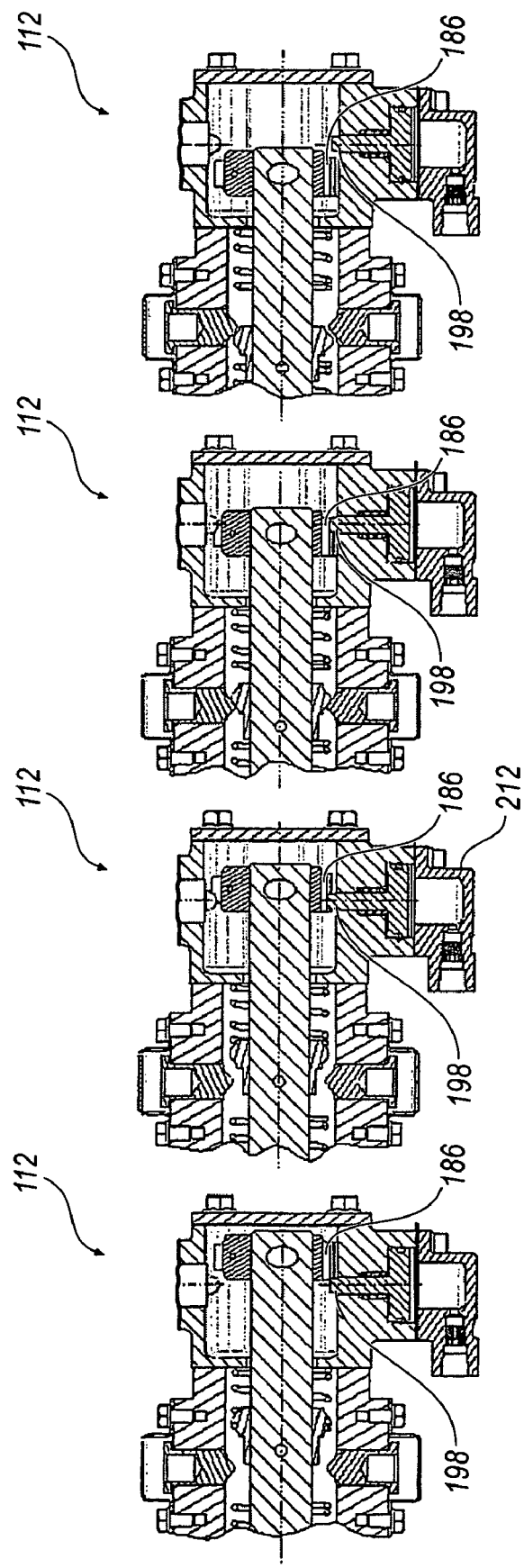
FIGS. 12A, 12B, 12C, and 12D are partial section views of the selector mechanism in the direction of line 12-12 in FIG. 11, illustrating exemplary relative component locations during operation.

With reference to FIG. 11, embodiments of selector mechanism 112 may be similar to FIG. 9 and also include a dual pressure switch 178, similar to position switch 150. Dual pressure switch 178, like position switch 150, has a plunger 180. It is to be appreciated that dual pressure switch 178 may also be characterized as a two position valve, directing high pressure fluid to actuator assembly 96 in a first condition, and low pressure fluid to actuator assembly 96 in a second condition. A locking cam ring 182 is disposed over and fixed to shaft 164 by a retaining pin 184 such that locking cam ring 182 moves unitarily with shaft 164. Dual pressure switch 178 is in selective alignment with locking cam ring 182 as will be later described in more detail. The locking cam ring 182 includes a shift shaft engaging portion 186 and a cam surface 188. When dual pressure switch 178 is aligned with locking cam ring 182, it engages the cam surface 188. Cam surface 188 axially displaces plunger 180 between a first position and a second position relative to axis A-A, thereby cycling dual pressure switch 178 between first control condition and a second control condition as will be described in more detail below.

FIGS. 12A-12D illustrate the relative positions of shift shaft 164 within selector mechanism 112 to demonstrate the relative positions of the locking piston engaging portion 198 and the shift shaft engaging portion 186. Specifically, FIG. 12A illustrates selector mechanism 112 with shift finger 140 adjacent to, or within, the low-rev gear range of shift gate 130. FIG. 12B illustrates selector mechanism 112 with shift finger 140 adjacent to, or within, the 1-2 shift gate 132. FIG. 12C illustrates selector mechanism 112 with shift finger 140 adjacent to, or within, the 3-4 shift gate 134. Additionally, FIG. 12D illustrates selector mechanism 112 with shift finger 140 adjacent to, or within, the 5-6 shift gate 136. As illustrated in FIGS. 12A and 12D, the locking piston engaging portion 198 cannot interfere with the shift shaft engaging portion 186 to prevent rotation of shift shaft 164. As illustrated in FIGS. 12B and 12C, the locking piston engaging portion 198 may interfere with the shift shaft engaging portion 186 to prevent rotation of shift shaft 164.

Figure 13:
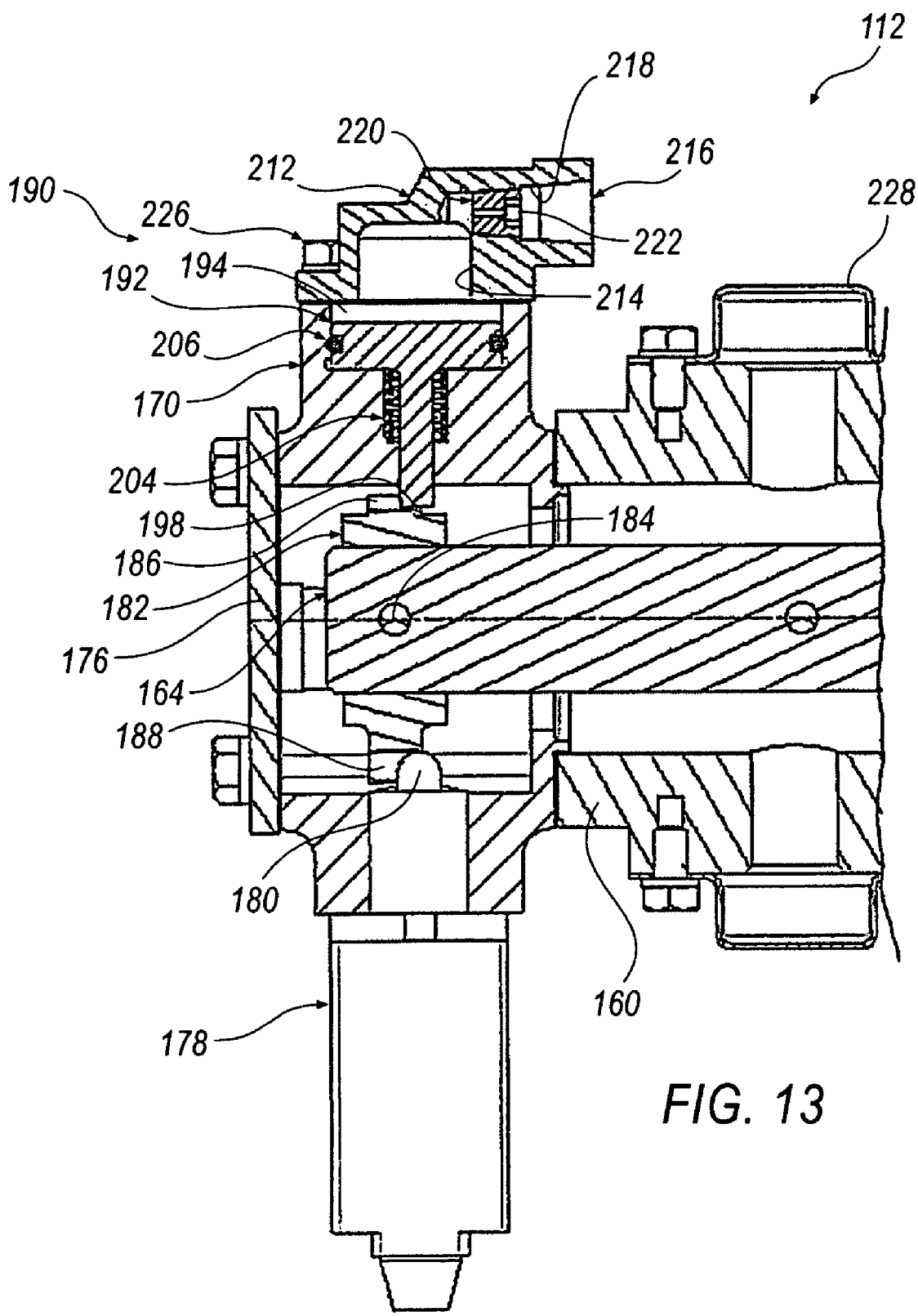
FIG. 13 is a partial section view of the selector mechanism, similar to FIGS. 12A, 12B, 12C, and 12D.

As best seen in FIG. 13, an embodiment of selector mechanism 112 may also include a main section neutral interlock 190. Main section neutral interlock 190 includes a locking piston 192 is disposed in a cylinder bore, or interlock chamber, 194 formed in housing extension 170 in alignment with and opposite dual pressure switch 178. The locking piston 192 has a coaxial stem 196 extending towards axis A-A. Stem 196 has a locking piston engaging portion 198 complementary in shape to the shift shaft engaging portion 186 in locking cam ring 182. Stem 196 slides within a clearance bore 200 passing from cylinder bore 194 into the housing cavity 162. Clearance bore 200 is enlarged by a spring counterbore portion 202 at the end proximate to cylinder bore 194. A return coil spring 204 encircles stem 196, and is disposed in clearance bore 200. Spring 204 biases the locking piston 192 away from axis A-A, and tends to disengage the locking piston engaging portion 198 of stem 196 from shift shaft engaging portion 186.

An O-ring seal 206 is disposed in a groove circumscribing the locking piston 192. Seal 206 seals the locking piston 192 relative to cylinder bore 194 while permitting relative movement therebetween. Engagement of locking piston engaging portion 198 in shift shaft engaging portion 186 prevents shifting the main section 12 out of neutral under certain conditions as will be explained in more detail below.

A dowel 208 extends from an inboard side of the locking piston 192 parallel to stem 196 and is slidably disposed in an aperture 210 parallel to clearance bore 200 in housing extension 170. Dowel 208 and aperture 210 cooperatively maintain the rotative alignment of locking piston engaging portion 198 relative to shift shaft engaging portion 186. Preferably, shift shaft engaging portion 186 is a slot formed in locking cam ring 182 parallel to axis A-A.

Preferably, the locking piston engaging portion 198 has a square end that engages with shift shaft engaging portion 186. Also preferably, a plane generally defined by the locking piston engaging portion 198 is generally parallel to a plane defined by the shift shaft engaging portion 186. In this manner, attempts by an operator to shift lever 114 while the locking piston engaging portion 198 is engaged with the shift shaft engaging portion 186 will result in interference between two relatively flat, parallel surfaces, thereby reducing wear on surfaces of the locking piston engaging portion 198 and the shift shaft engaging portion 186.

Cylinder bore 194 is closed, and the locking piston 192 retained therein, by a cylinder cover 212 disposed over cylinder bore 194. In one embodiment, cover 212 has a first cavity 214 disposed over and communicating with cylinder bore 194. Cover 212 has a fitting feature 216 with a passageway 218 therein intersecting cavity 214, enabling fluid communication from cylinder bore 194 to the exterior of cover 212. Fitting feature 216 is configured to accommodate a pre-selected pipe or hose connector. A plug 220 having a bleed orifice 222 is disposed in passageway 218. Bleed orifice 222 is, in a preferred embodiment, 0.040 inches in diameter. Air flowing in and out of cylinder bore 194 must pass through orifice 222. Cover 212 is clamped against housing extension 170 by a plurality of screws 226.

Caps 228 disposed over a spring biased detent plungers which provide the vehicle operator a sense of having shifted between the high range and the low range. The bias springs and plungers and an associated ring mounted on shaft 164 are not relevant to the present embodiment, and are not shown. Also not shown are elements within housing which tend to bias shaft 164 to a predetermined position along axis A-A within housing 160.

Referring back to FIGS. 2, 5, and 7-9, a connecting crank 230 is clamped to an end of shaft 164 opposite the end where the locking cam ring 182 is positioned. Connecting crank 230 is connected through shift linkage 116 to shift lever 114. A cylindrical accordion-type seal 232, combined with a sealing ring 236, seals shaft 164 relative to housing 160. Lateral movement of shift lever 114 by the vehicle operator axially displacement of shaft 164 along axis A-A and corresponding lateral movement of shift finger 140 between shift gates 130, 132, 134, 136, 138. Fore-aft movement of shift lever 114 rotates shaft 164 about axis A-A, resulting in fore-aft movement of shift finger 140. Such fore-aft movement of shift finger 140 results in displacement of a one of the shift forks 100, 102 and 104 depending on the shift gate 130, 132, 134, 136, 138 in which shift finger 140 is disposed prior to the initiation of the fore-aft movement.

It is appreciated that the precise form and location of switches 150 and 178 may be varied without effect. For example, an electrical switch in combination with a solenoid could be substituted for switches 150 and 178. Further, switches 150 and 178 or substitutes therefore could be located in other places where there is motion relating to the main section gear engagement, such as at shift lever 114 or at the shift rails 120, 122, 124.

Figure 14:
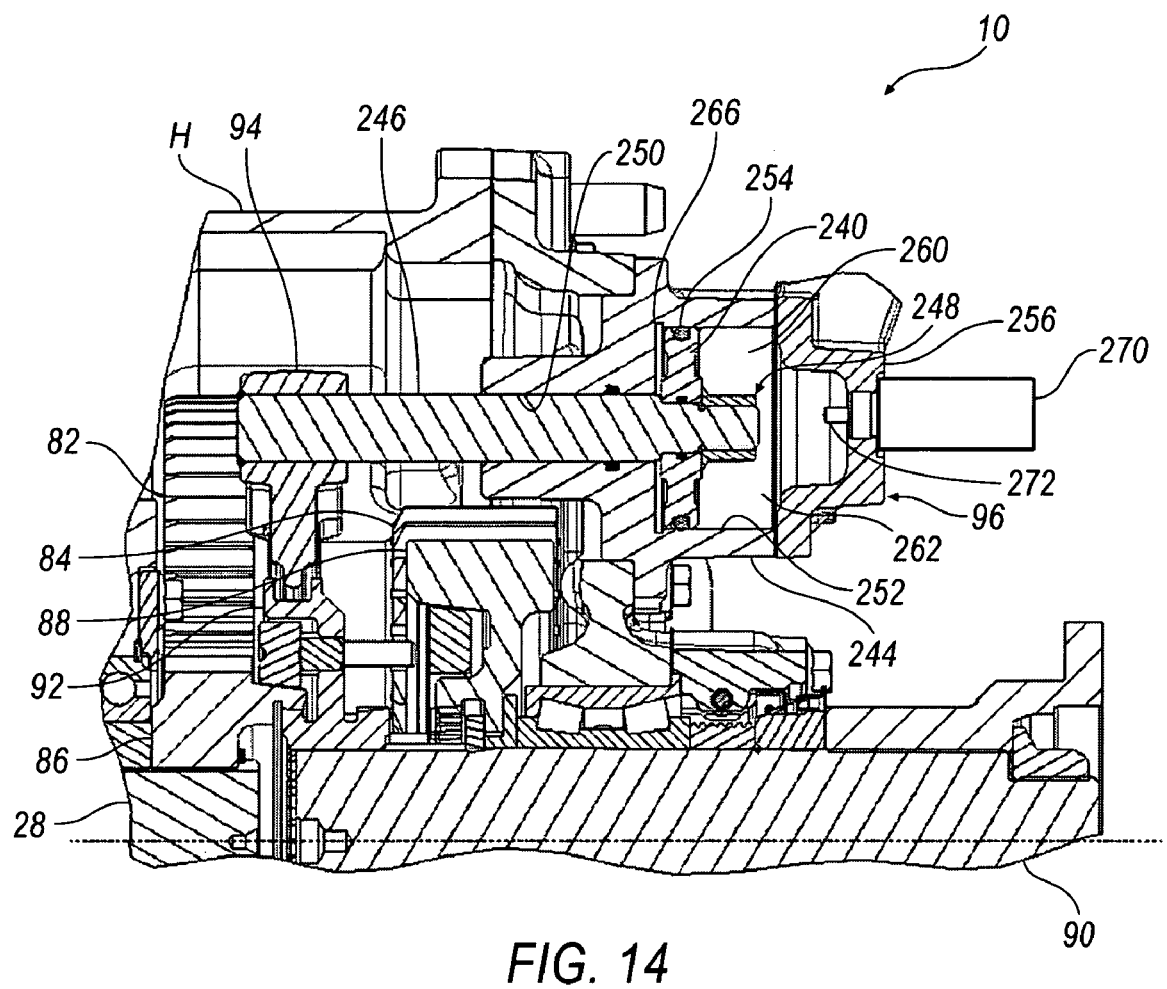
FIG. 14 is a partial section view of an embodiment of the range section of an exemplary transmission.

FIG. 14 illustrates the range section shifting actuator assembly 96 in more detail. In the orientation shown, the actuator assembly 96 is in the "high" range, with gear 86 locked to output shaft 90 by jaw clutch assembly 92.

Actuator assembly 96 includes a piston 240 and a cylinder housing 244. A connecting rod 246 fixes the piston 240 to the range shift fork 94. Piston 240 is clamped against a shoulder of connecting rod 246 by a locking nut 248. Cylinder housing 244 has a through bore 250 which slidably receives connecting rod 246. Through bore 250 opens to a cylindrical piston bore 252 in which piston 240 is slidably disposed. An O-ring 254 seals piston 240 against piston bore 252. Piston bore 252 is closed, and piston 240 retained therein, by an actuator cylinder cover 256 disposed over piston bore 252. Housing 244 and cover 256, at least in part, define a piston chamber, or range chamber, 260.

The piston 240 divides the piston chamber 260 into a high range side 262 and a low range side 266. Supplying pressure to the high range side 262 displaces the range shift fork 94 to engage jaw clutch assembly 92 with gear 86, shifting the range section 14 to the range high ratio. Supplying pressure to the low range side 266 displaces the range shift fork 94 to engage jaw clutch assembly 92 with gear 88, moving the piston 240 to a low range condition and shifting the range section 14 to the range low ratio.

A range sensor valve 270 is disposed in line with the connecting rod 246. Range sensor valve 270 has a plunger 272 displaced by the connecting rod 246, indicating that the range section 14 is fully engaged in the range low ratio, or low condition. In such a condition, although inconsistent with the orientation of the elements in FIG. 14, piston 240 would be fully displaced to the right side of chamber 260. Thus provided, the range sensor valve 270 detects the position, or the engaged ratio of the range section 14. As illustrated in FIG. 14, the piston 240 is in the left side of chamber 260, and the range section 14 is engaged in the range high ratio.

With continuing reference to FIGS. 9 and 14, position switch 150 is a two position switch with in which plunger 152 is spring biased to a first position. In a first position, position switch 150 communicates pressurized air to the low range side 266 of actuator piston chamber 260 and simultaneously opens the high range side 262 of actuator piston chamber 260 to exhaust. In a second position, position switch 150 communicates pressurized air to the high range side 262 of actuator piston chamber 260 and simultaneously opens the low range side 266 of actuator piston chamber 260 to exhaust. Engagement of plunger 152 against a cam surface 168 integrated into collar portion 166 moves position switch 150 between the first and second positions. Axial movement of shaft 164 causing shift finger 140 to move from 3-4 shift gate 134 to 5-6 shift gate 136 results in plunger 152 being moved to the second position. Conversely, axial movement of shaft 164 causing shift finger 140 to move from 5-6 shift gate 136 to 3-4 shift gate 134 results in plunger 152 being moved to the first position.

As described below, illustrated embodiments of a shift inhibitor utilize at least some of the components described herein. That is, the shift inhibitor encompasses those portions of the transmission 10 that reduce the undesirable shifting of the main section 12 into a gear when the range section 14 is not in the desired condition, as described in greater detail below. In the event that the main section 12 shift is completed before a desired range section 14 shift is completed, the range section 14 may be in a "neutral" ratio, wherein neither gear 86 or 88 is engaged with the jaw clutch assembly 92. If the range section 14 is in the "neutral ratio", the actuator assembly 96 may not shift the range section 14 into a ratio, and the transmission 10 may be in "neutral", where input shaft 16 is not engaged with output shaft 90, although the operator has manipulated the shift lever 114 into a desired gear (FIG. 2).

Figure 15:
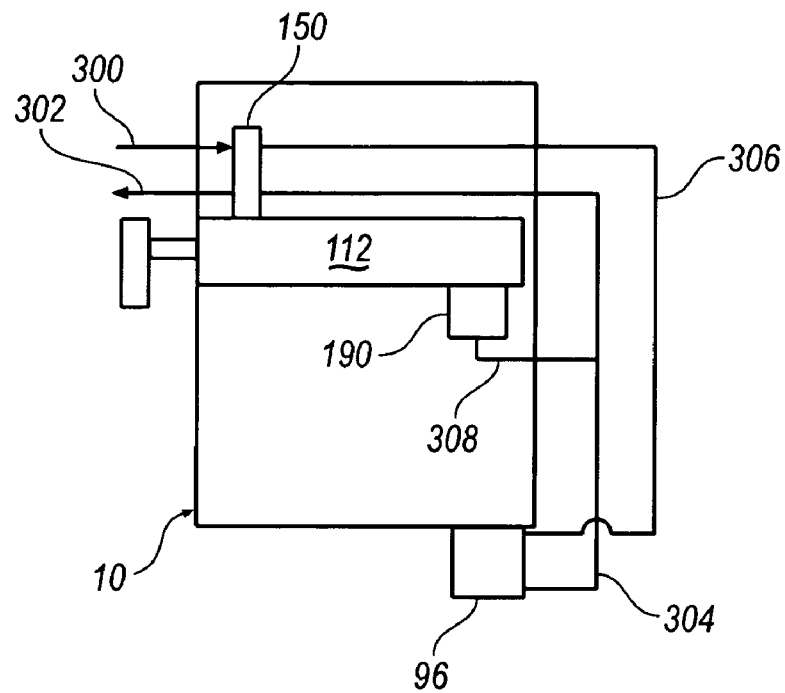
FIG. 15 is an exemplary schematic diagram of the air supply routing for a first embodiment.

With specific reference to FIGS. 13 and 15, a first embodiment will be described. In the first embodiment, actuator assembly 96, main section neutral interlock 190 and position switch 150 are employed. Dual pressure switch 178, cam surface 188 and range sensor valve 270 are not employed. As shown in FIG. 15, position switch 150 is connected to a high pressure air supply line 300 and to exhaust 302 in the form of a port or a line. Position switch 150 is also connected via a first air line 304 to high range side and via a second air line 306 to low range side 266. Position switch 150, as described above, connected air lines 304 and 306 to high pressure air via supply line 300 and to exhaust 302. Neutral interlock 190 is connected to first air line 304 by a third air line 308. In the present embodiment, range sensor valve 270 is not employed.

The exhaust 302 performs as a common air line for exhausting both the range chamber 260 and the interlock chamber 194. That is, when exhaust 302 is connected to the first air line 304, both air lines 304 and 308 are exhausted. Therefore, exhaustion of the interlock chamber 194, in fluid communication with the air line 308, and the range chamber 260, in fluid communication with the first air line 304, is initiated generally concurrently as both the range chamber 260 and the interlock chamber 194 are, at least in part, exhausted simultaneously.

With continual reference to FIGS. 13 and 15, operation of the first embodiment will be discussed. When the position switch 150 is in a low range position, pressurized air is supplied via air line 306 to actuator assembly 96, engaging range section 14 in the low range condition. Movement of shift lever 114 by the operator from the 3-4 position to the 5-6 position (FIG. 8) causes shift finger 140 to move to the 5-6 gate 136, and position switch 150 to be switched by displacement of plunger 152 to the high range position. This causes the air in low range side 266 to be exhausted simultaneously with pressurized air being supplied to high range side 262 via the first air line 304. Pressurization of the high range side 262 and the first air line 304 also cause the locking piston 192 to be biased toward axis A-A against the force of spring 204. As shown in FIG. 12D, locking piston engaging portion 198 is not in alignment with shift shaft engaging portion 186 in the 5-6 position of shaft 164. Displacement of piston to its fully extended position will not be immediate with the application of pressure, due to the time delay caused by orifice 222, as discussed above.

When a downshift is made from the 5-6 gate 136 to the 3-4 gate 134 (i.e. from the 5-6 throw position 146 to the 3-4 throw position 144), position switch 150 (FIG. 8) is actuated, and locking piston engaging portion 198 slides into shift shaft engaging portion 186 (FIG. 12C). With locking piston engaging portion 198 so engaged in shift shaft engaging portion 186, the operator is unable to move the shift lever in a fore-aft direction to engage a main section gear. At the same time, due to the action of position switch 150, air line 306 is pressurized and air line 304 exhausted. However, because of the orifice 222 restriction, cylinder bore 194 is not exhausted immediately. It accordingly delays the time before which the vehicle operator can successfully complete a main section shift into gear. Given the anticipated line air pressure of 80 psi (pounds per square inch) and the orifice diameter of approximately 0.040 inches, the expected resultant delay will be approximately 0.8 seconds. A delay time of approximately one second is preferred. Once the time period of approximately one second has lapsed, the vehicle operator will be able to shift into the desired gear. The delay of 0.8 seconds has been found to provide adequate time for the shift to low range to be completed by actuator assembly 96 in most circumstances.

Figure 16:
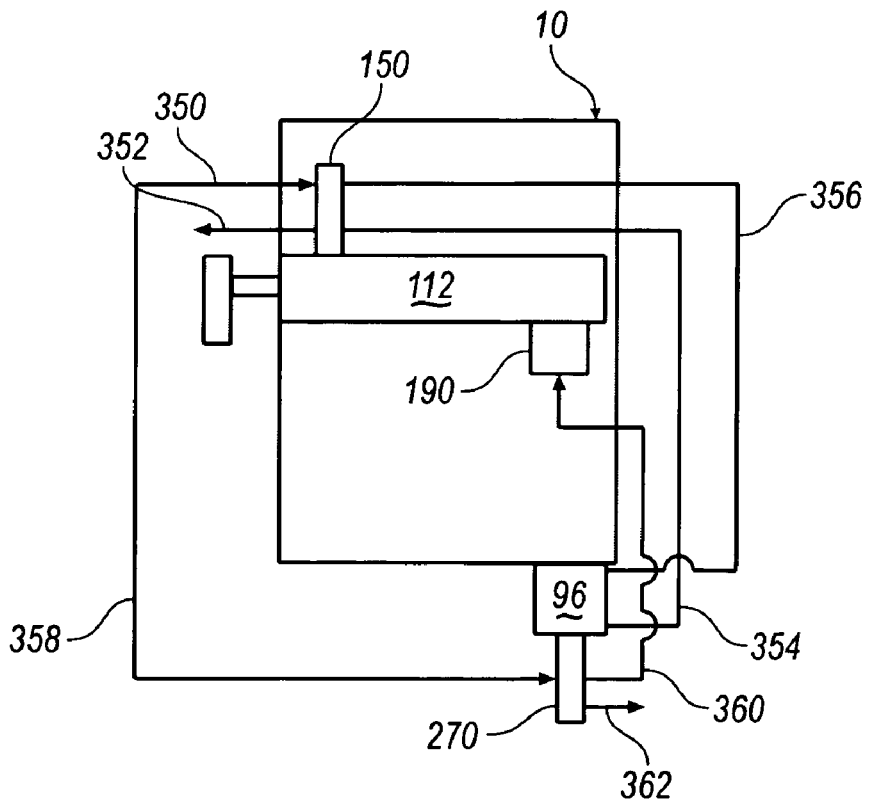
FIG. 16 is an exemplary schematic diagram of the air supply routing for a second embodiment.
Figure 17:
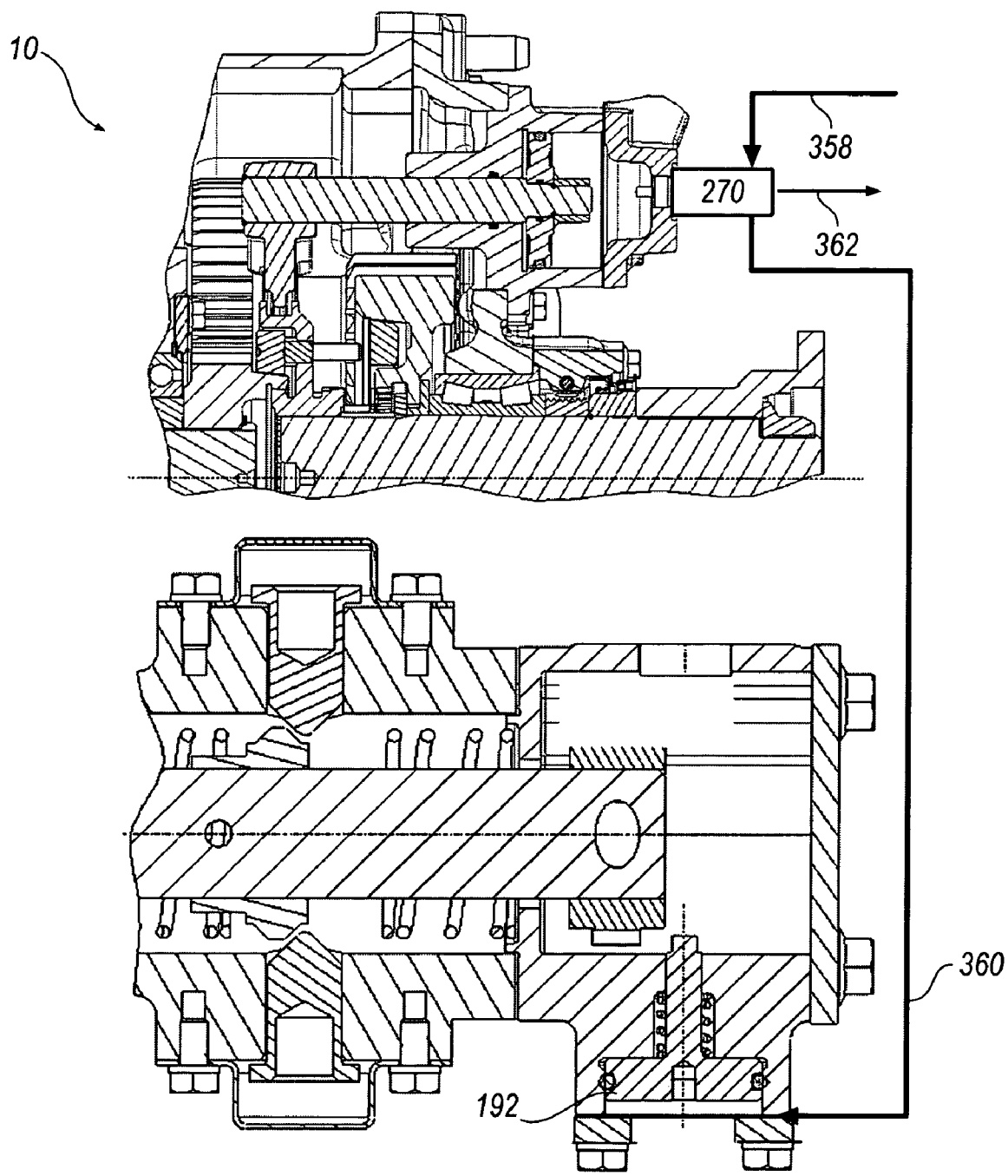
FIG. 17 is an exemplary schematic diagram of the air supply routing for the second embodiment and some relevant components in section.

With specific reference to FIGS. 14, 16 and 17, a second embodiment is illustrated. Orifice 222 and dual pressure switch 178 and cam surface 188 are not employed. Cover 212 need only provide an attachment means for an air line. As shown in FIG. 16, position switch 150 is connected to a first high pressure air supply line 350 and to exhaust 352 in the form of a port or a line. Position switch 150 is also connected via a first air line 354 to the high range side 262 and via a second air line 356 to low range side 266. Position switch 150, as described above, connected air lines 354 and 356 to high pressure air via supply line 350 and to exhaust 352. A second high pressure air supply line 358 is connected to the range sensor valve 270. The range sensor valve 270 is connected to neutral interlock 190 by a third air line 360. The range sensor valve 270 has an exhaust port 362. The range sensor valve 270 is a two position valve. In a first condition indicative of the actuator assembly 96 not being in a low range condition, high pressure air is passed from the air supply line 358 to air line 360 to bias the locking piston 192 toward axis A-A (FIG. 17). In a second condition indicative of the actuator assembly 96 being in a low range condition, the range sensor valve 270 blocks the high pressure air from the air supply line 358 to air line 360, and connects the air line 360 to the exhaust port 362.

Operation of the second embodiment may be as follows. When the position switch 150 is in a low range position, consistent with shift lever 114 manipulating shift finger 140 to be aligned, for example, with the 1-2 shift gate 132 or the 3-4 shift gate 134 (FIGS. 12B and 12C), pressurized air is supplied via air line 356 to actuator assembly 96, putting the range section 14 in the low range condition. Movement of shift lever 114 by the operator to the 5-6 position causes shift finger 140 to move to the 5-6 shift gate 136, and position switch 150 being switched to the high range position (as plunger 152 is displaced by cam surface 168). As best seen in FIG. 16, when position switch 150 is switched to the high range position, the air in low range side 266 will be exhausted (via the second air line 356) as pressurized air is supplied to high range side 262 (via the first air line 354). As the high range side 262 is pressurized, the connecting rod 246 is urged away from the range sensor valve 270 (FIG. 14) and the range section 14 is shifted to the high range position as jaw clutch assembly engages with mainshaft 28 (FIG. 1). As mentioned earlier, the range sensor valve 270 detects the actuator assembly 96 not being in a low range condition, and causes pressured air to flow from the air supply line 358 to air line 360.

Pressurization of air line 360 (due to the movement of shift finger 140 from within the 3-4 shift gate 134 to within the 5-6 shift gate 136) causes pressurized air to travel from the range sensor valve 270 to the neutral interlock 190. As pressurized air enters the neutral interlock 190, the locking piston 192 is biased toward axis A-A against the force of spring 204. As best illustrated in FIG. 12D, when the shift lever 114 is in the 5-6 position, locking piston engaging portion 198 is not in alignment or engagement with shift shaft engaging portion 186. Displacement of the locking piston 192 to its fully extended position will be nearly immediate with the direction of pressurized air via air line 360.

When the operator downshifts from the 5-6 gate 136 to the 3-4 gate 134, the locking piston engaging portion 198 slides into the shift shaft engaging portion 186 (as best seen in FIG. 12C), thus placing the neutral interlock 190 in a locked condition. With locking piston engaging portion 198 engaged in shift shaft engaging portion 186, movement of the shift lever 114 in a fore-aft direction is restricted (since rotation of shift shaft 164 is restricted by the interference between the locking piston engaging portion 198 and the shift shaft engaging portion 186). With movement of shift lever 114 thus restricted, an operator cannot engage a main section 12 gear for low range. That is, the 1-2 gate 132 and the 3-4 gate 134 cannot be manipulated to engage a gear while the locking piston engaging portion 198 engages the shift shaft engaging portion 186.

As the shift lever 114 is moved from the 5-6 gate 156 to the 3-4 gate 134, position switch 150 is actuated to the low range position (as plunger 152 is displaced by cam surface 168). When the position switch 150 is thus actuated, air line 356 is pressurized and air line 354 is exhausted. Concurrently, because of the pressure in air line 360, rotation of shaft 164 continues to be restricted. When the range sensor valve 270 detects the connecting rod 246, then the range section 14 is in the low range condition (by the depression of plunger 272). The depression of plunger 272 causes the range sensor valve 270 to exhaust the air line 360 through the exhaust port 362.

When the air line 360 is thus exhausted, the locking piston 192 is urged by spring 204 away from the axis A-A, thereby disengaging the locking piston engaging portion 198 from the shift shaft engaging portion 186, and placing the neutral interlock 190 in a released condition. As locking piston engaging portion 198 is disengaged from the shift shaft engaging portion 186, the shift shaft 164 is permitted to rotate. The operator can then manipulate the shift lever 114 in the fore or aft direction (FIG. 2) to cause the shift finger 140 to displace either the 1-2 gate 132 or the 3-4 gate 134. When either the 1-2 gate 132 or the 3-4 gate 134 is displaced, the main section 12 may be engaged.

Figures 18, 19:
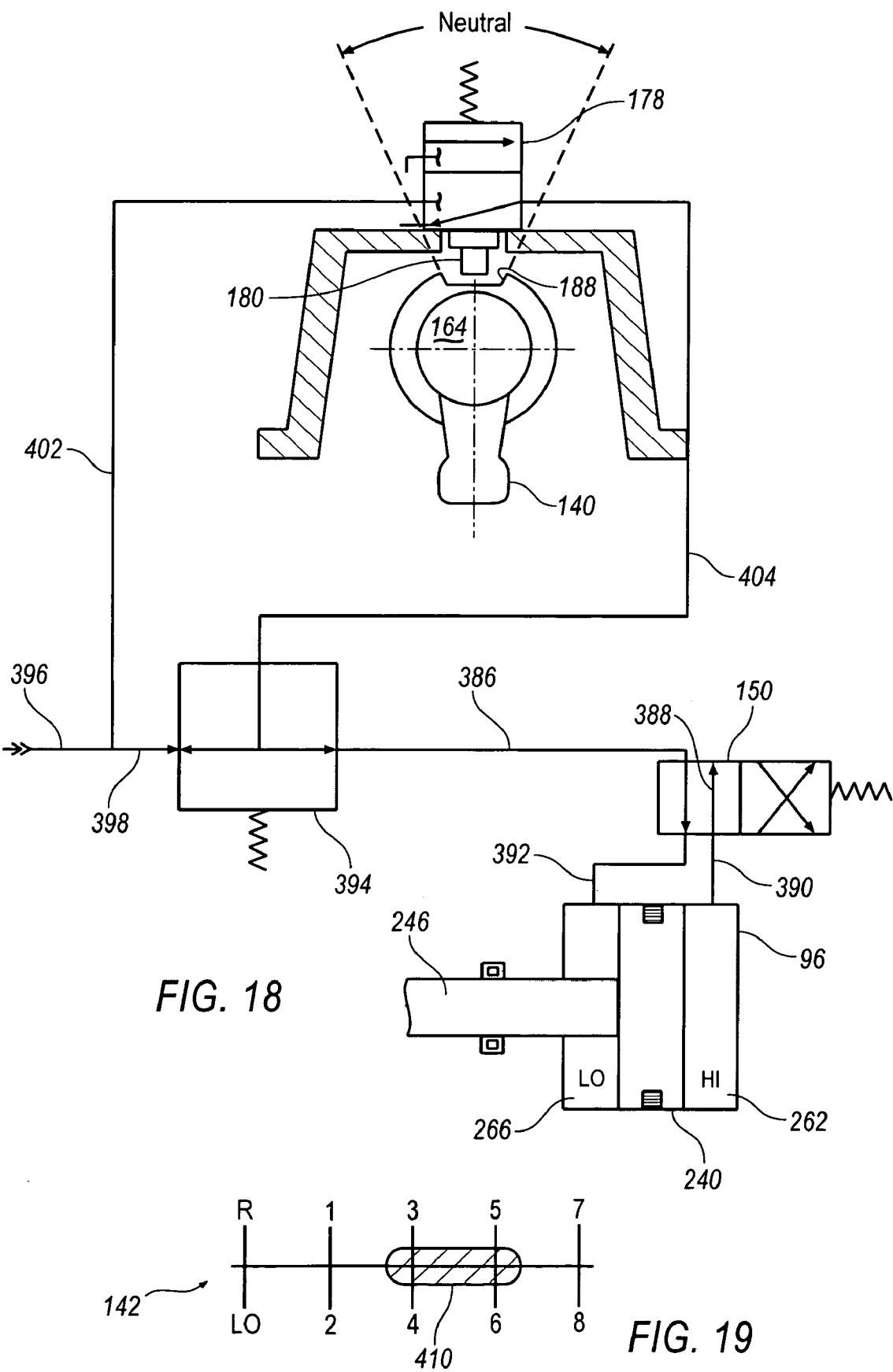
FIG. 18 is an exemplary schematic diagram of the air supply routing for a third embodiment and some relevant components in section.
FIG. 19 is a schematic illustration of a shift pattern.

With specific reference to FIG. 18, a third embodiment is at least partially illustrated. Dual pressure switch 178 is employed (see also FIG. 13). The range sensor valve 270 and main section neutral interlock 190 are not employed. As shown in FIG. 18, position switch 150 is connected to a dual pressure air supply line 386 and an exhaust 388. Exhaust 388 may be in the form of a port or a line. Position switch 150 is also connected via a first air line 390 to high range side 262 of actuator piston chamber 260. Position switch 150 is further connected via a second air line 392 to low range side 266 of actuator piston chamber 260. Position switch 150, as described above, operably connects air lines 390 and 392 to dual pressure air via supply line 386 and to exhaust 388. The dual pressure air line 386 is connected to a dual pressure regulator 394 from which the dual pressure air supply line 386 receives pressurized air. A master supply air line 396, providing high pressure air, is connected to a first branch 398 connected to the dual pressure regulator 394. Master supply air line 396 is also connected to dual pressure switch 178 by a second branch 402. A control air line 404 interconnects dual pressure switch 178 with dual pressure regulator 394.

When control air line 404 is vented via dual pressure switch 178, dual pressure regulator 394 supplies high pressure air to the dual pressure air supply line 386. When control air line 404 is pressurized via dual pressure switch 178, dual pressure regulator 394 supplies low pressure air to the dual pressure air supply line 386.

Dual pressure switch 178, in a first condition illustrated in FIG. 18, blocks high pressure air from reaching dual pressure regulator 394, allowing the transmission of high pressure, approximately 80 pounds per square inch (psi), to be transmitted to dual pressure air supply line 386. In a second condition, not illustrated, dual pressure switch 178 communicates high pressure air to dual pressure regulator 394 which results in dual pressure regulator 394 reducing the pressure of air transmitted by dual pressure regulator 394 from first branch 398 to dual pressure air supply line 386 to approximately 20 psi. In an embodiment, the high pressure air is in a range of about 30 psi to about 110 psi, and the air transmitted by dual pressure regulator 394 from first branch 398 to dual pressure air supply line 386 is in a range of about 5 psi to about 30 psi. FIG. 19 illustrates a preferred range of positions 410 within the shift pattern 142 where the dual pressure switch 178 may cause a high pressure air to be supplied to the actuation assembly 96.

An exemplary operation of the third embodiment is as follows. When the main section is in neutral, as determined by the engagement between plunger 180 and cam surface 188, dual pressure switch 178 signals the dual pressure regulator 394 to allow full pressure to reach position switch 150 and to thus reach range actuator assembly 96. When the main section is in gear (gates 1-2, 3-4, 5-6 or 7-8), dual pressure switch 178 communicates full pressure to dual pressure regulator 394, thereby regulating the pressure supplied to position switch 150 to 20 psi. This lower pressure is adequate to hold a range synchronizer of jaw clutch assembly 92 in gear in the event that range section 14 shifting was completed before the main section 12 shift was completed, but not high enough to damage a range synchronizer of jaw clutch assembly 92 if the range section 14 shift was not completed before the main section 12 shift was completed.

While the dual pressure regulator 394 is described as a single component, preferably contained within a single housing, the dual pressure regulator 394 may be provided as an adjustable regulator that increases pressure relative to the shift lever position, and may also be a regulator in parallel with a high pressure line that includes a 3-way valve capable of supplying either the high pressure or the regulated pressure to the piston chamber 260.

It should be appreciated that the first and third embodiments could be used in the same transmission with the third embodiment providing a secondary, or back-up, means of protecting the range synchronizers of jaw clutch assembly 92. FIG. 13 illustrates the combination of the main section neutral interlock 190 of the first embodiment with the dual pressure switch 178 of the third embodiment. While the third embodiment is described as having the dual pressure switch 178 connect a high pressure source to the piston chamber 260 of the range section shifting actuator assembly 96 when the shift lever 114 is in any neutral position, the dual pressure switch may be configured to connect the piston chamber 260 with a high pressure source only when the shift lever is in the range of positions 410 illustrated in FIG. 19, thereby reducing the neutral positions of shift lever 114 that result in an undesired increase in pressure against range piston 240 when a range section 14 shift is not desired.

While the working fluid used in the illustrated embodiments is described as air, the fluid may be any suitable fluid including a liquid that is generally incompressible, and thus not pressurized as air, but displaced in reaction to an outside force or pressure. Furthermore, the application of the working fluid may be used to displace a piston, rotate an impeller, or to provide any other hydraulic/pneumatic to mechanical energy transfer. Additionally, while the control signals described herein are transmitted via a fluid such as air, to a device, such as a piston, the control signals may be transmitted via optical, electrical, or mechanical conveyances to suitable devices, although the control signals are preferably transmitted through movement of air.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A shift inhibitor apparatus for encouraging the completion of a range shift in a range section of multispeed transmission prior to the completion of a main shift in a main section of the multispeed transmission, the transmission including an input shaft and an output shaft, the transmission main section having a plurality of selectively engageable ratios, wherein the range section is shiftable between a range high ratio and a range low ratio, the shift inhibitor comprising:

a range actuating assembly having a range chamber, wherein at least a portion of said range actuating assembly is moveable between a range first ratio and a range second ratio, said portion of said range actuating assembly is moveable, at least in part, in response to a fluid pressure, and said range chamber is selectively in fluid communication with a vent; and a main section neutral interlock having an interlock chamber, wherein at least a portion of said main section neutral interlock is moveable between a first condition and a second condition, said interlock chamber is selectively in fluid communication with said vent, wherein said range chamber can be exhausted such that said range section is selectively switched from said first ratio to said second ratio, and wherein said interlock chamber can be exhausted such that said main section neutral interlock is selectively switched from said first condition to said second condition; and an orifice portion interposed between the interlock chamber and the vent wherein the orifice portion will delay venting the interlock chamber by at least a preselected amount of time;

wherein the shift apparatus provides a time delay beginning after the initiation of the shift between gears of the range section to encourage completion of the range shift prior to completion of the main shift.

2. The apparatus of claim 1, wherein said second condition is a released condition.

3. The apparatus of claim 1, wherein said orifice selectively delays the interlock from being switched to the second condition until the completion of a range shift.

4. The apparatus of claim 1, wherein said range chamber and said interlock chamber are selectively vented through a common fluid line.

5. The apparatus of claim 1, wherein said interlock selectively retains the main section of the transmission in a neutral condition.

6. The apparatus of claim 1, wherein said interlock selectively permits rotation of a shift member when in the released condition, thereby permitting a gear shift in the main section of the transmission.

7. The inhibitor of claim 1, wherein at least a portion of a shift member is rotatable to selectively engage the input shaft with the output shaft, and at least a portion of said shift member is axially moveable to selectively engage a plurality of shift gates.

8. The apparatus of claim 1, wherein said interlock cannot restrict movement of a shift member when the shift member is in a high range position.

9. The apparatus of claim 1, wherein said interlock selectively restricts rotation of a shift member when in the locked condition.

10. The apparatus of claim 1, further comprising a shift member, wherein the shift member includes a shift finger that selectively engages at least one of a plurality of shift gates to selectively engage at least one of the plurality of the selectively engageable ratios.

11. The apparatus of claim 1, further comprising a shift member, wherein the shift member includes an engaging surface, and wherein said engaging surface selectively engages a position switch.

12. The apparatus of claim 11, wherein said position switch selectively transmits a control signal to said interlock to position said interlock in the locked condition.

13. The apparatus of claim 12, wherein said control signal is transmitted via a fluid.

14. The apparatus of claim 1, further comprising a shift member, wherein the shift member is manually controlled by a user of the transmission.

15. The apparatus of claim 1, wherein a user manually manipulates a single transmission input device to selectively engage each gear.

16. A method of encouraging the completion of a range shift in a range section of multispeed transmission prior to the completion of a main shift in a main section of the multispeed transmission, wherein the multispeed transmission includes an input shaft, an output shaft, the range section shiftable between a first ratio and a second ratio, and the main section has a plurality of selectable gear ratios, the method comprising the steps of:

shifting the main section from a first predetermined gear to a second predetermined gear, wherein said step of shifting the main section includes the steps of initiating a shift between gears of the main section and completing the shift between gears of the main section;

detecting a position of a shift member, wherein said step of detecting is performed after said step of initiating the shift between gears of the main section and before said step of completing the shift between gears of the main section;

shifting the range section from the first ratio to the second ratio, wherein said step of shifting the range section includes the steps of initiating a shift between gears of the range section and completing the shift between gears of the range section, wherein said step of shifting the range section is performed, at least in part, by a fluid actuated device;

prohibiting the shifting of the main to the second predetermined gear by engaging an interlock to restrict movement of a shift member; and selecting an orifice inner diameter of an orifice portion to provide at least a preselected time delay between the initiation of the shift between gears of the range section and the initiation of the shift between gears of the main section.

17. The method of claim 16, further comprising releasing the shift member, wherein said step of releasing permits the shift member to selectively engage the output shaft with the input shaft.

18. The method of claim 17, wherein the step of shifting the range section further comprises the step of venting a range chamber, the step of releasing further comprises the step of venting the interlock chamber through an orifice, and wherein said steps of venting are performed, at least in part, currently such that the orifice delays the completion of said releasing step until after the completion of said step of shifting the range section.

19. The method of claim 17, wherein said step of releasing is delayed a predetermined amount of time to permit the completion of said step of shifting the range section prior to the completion of said step of releasing.

* * * * *